Figure 1:
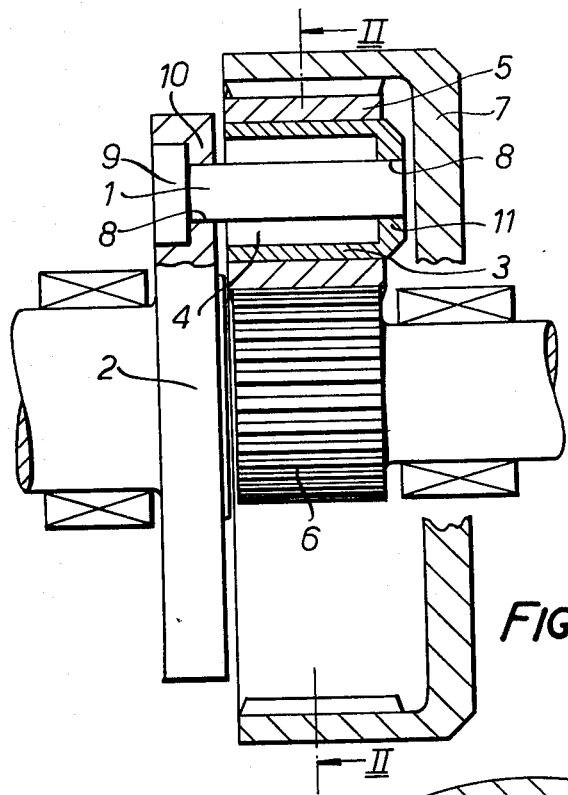

United States Patent [19]
Hicks

[11] 3,964,334
[45] June 22, 1976

[54] GEARS
[75] Inventor: Raymond John Hicks, Llanwrthwl near Llandrindod Wells, Wales
[73] Assignee: Vickers Limited, London, England
[22] Filed: Apr. 3, 1975
[21] Appl. No.: 564,754

[30] Foreign Application Priority Data
Apr. 18, 1974 United Kingdom............... 17144/74

[52] U.S. Cl.................................... 74/410; 74/411; 74/801
[51] Int. Cl.² ..................... F16H 57/00; F16H 1/28
[58] Field of Search...................... 74/410, 411, 801

[56] References Cited
UNITED STATES PATENTS
| | | | |
|---|---|---|---|
| 2,102,167 | 12/1937 | Rotter | 74/411 |
| 3,303,713 | 2/1967 | Hicks | 74/411 |
| 3,381,548 | 5/1968 | Wolkenstein | 74/801 |

Primary Examiner—Leonard H. Gerin
Attorney, Agent, or Firm—Reed Smith Shaw & McClay

[57] ABSTRACT

A flexible, cantilevered, gear wheel support, comprising a flexible spindle united at one end with a carrier and at the other end with a gear wheel support sleeve by means of welds effected by electron beam welding.

3 Claims, 2 Drawing Figures

U.S. Patent   June 22, 1976   3,964,334

GEARS

This invention relates to gears, and whilst primarily concerned with the mounting of planet pinions in epicyclic gearing, may also be applicable to other forms of parallel shaft mounted gear trains. The expression "epicyclic gearing" is used herein to refer to gear arrangements comprising a central sun pinion, a plurality of planet pinions meshed therewith, and an annulus gear surrounding the planet pinions and meshed therewith; the planet pinions being mounted upon a carrier member which may be static or rotational in operation.

The nature of the gear wheel mountings with which this invention is concerned is disclosed in British Pat. No. 1,101,131 wherein epicyclic gearing is described in which each planet pinion is carried on a sleeve arranged co-axially with and supported by a flexible pin mounted as a cantilever from a carrier, the purpose of the cantilevered flexible pins being to permit small positional changes of the axes of rotation of the planet pinions, during operation, and yet to permit the planet pinions to retain true parallel alignment with the axes of the mating gears to facilitate a load sharing function within the gear train.

In practical examples of such gearing it has been the practice to employ force interference fits at the engagements of the ends of each pin with the carrier and with a sleeve supporting the planet pinion, the total deflection of this assembly, in the operational mode, deriving partly from normal elastic deformation of the component parts, comprising carrier, flexible pin and sleeve, and partly from local deformation of the grip surfaces and hence relaxation of grip, at the force fit engagements of the pin with the carrier and sleeve. However this gives a component of total flexure of the assembly that is completely indeterminate because of the complexities of the fastening, embracing as it must workshop tolerances in dimensioning for interference fits, the unknown extent of slippage due to relaxation of grip between surfaces in contact, the unknown extent of deformation of the grip surfaces, and the effect of the friction forces arising from slippage. Thus in practice the overall flexure of such an assembly for given parameters of loading cannot be predetermined or controlled, and this disadvantage is of particular consequence in cases where the speed of rotation of the carrier is high, as in applications for use with gas turbines, or in other cases that give rise to centrifugal forces of significant magnitude, because the planet pinions may suffer a radial excursion greater than that which can be tolerated for correct meshing of gear teeth.

According to one aspect of the present invention there is provided a flexible, cantilevered, gear wheel support, comprising a flexible spindle united at one end with a carrier and at the other end with a gear wheel support sleeve by means of welds effected by electron beam welding.

According to another aspect of the present invention there is provided a gear train having gear wheels mounted on a gear wheel support, the support being as just defined.

By securing the flexible spindle to the carrier, at the one end, and to the sleeve at the other, by means of electric beam welding, it is possible to effect a permanent union between a pin of circular cross-section and the boundary surfaces of a round hole of similar size, without incurring residual shrinkage stresses of significant magnitude, or creating other undesirable metallurgical faults in the material. The assembly so formed by welding together separate elements provides an integral structure whose flexural behaviour under operational loads is governed entirely by elastic deformation of the component parts. In the operational mode such an assembly is capable of accepting higher ranges of stress in the material near to the surfaces that are joined together than can be accepted by similar assemblies united by welding process other than electron beam welding or by means of interference fits.

Figure 2:
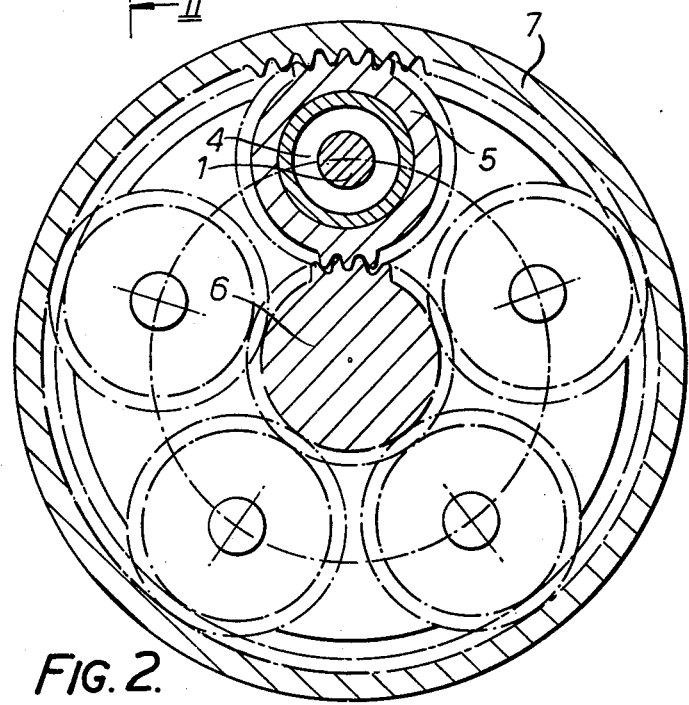

For a better understanding of the invention and to show how the same may be carried into effect, reference will now be made, by way of example, to the accompanying drawing, in which:

FIG. 1 is a diagrammatic sectional side view illustrating an epicyclic gear, and FIG. 2 is a section taken along the line II—II of FIG. 1.

In FIG. 1 there is shown one of a plurality of flexible pins constituting spindles serving as planet pinion mounting members that are fastened to the carrier 2 of an epicyclic gear, thus forming a system of cantilever supports. Each pin 1 has fastened at its outermost end a sleeve 3. Each sleeve 3 is positioned co-axially about the protruding length of its supporting flexible pin 1, and an internal annular clearance 4 exists over the greater span of each assembled pin and sleeve, within which space pin deflection may take place. Each planet pinion 5 is mounted upon the bearing surface of its associated sleeve 3 so that it may rotate freely, but is in mesh with a centrally disposed sun pinion 6 and a surrounding annulus gear 7.

Each flexible cantilevered pin 1 is attached to the carrier 2, and to its sleeve 3, by means of welding, the welds 8 being effected by the process known as electron beam welding. Thus these parts are permanently and rigidly retained in the form of a fabricated unit. When the gearing is in motion and is influenced by operational loads, each co-axial pin and sleeve assembly is permitted to flex from its true mounting centre and enable a lateral but parallel displacement of each planet pinion subjected to operational load and by so doing, perform a load sharing function within the gear train.

Welded attachments, as described, do not require the length of pin, in engagement with the carrier and with the sleeve, that would be necessary in the case of attachments effected by means of interference fits. In these latter cases, the attachments rely for strength upon grip forces which are a function of the area of the surfaces in contact and thus the linear extent of the pin involved in the engagement.

With welded attachments it is possible to limit the linear extent of pin engagement to that which will accept the flexing moments imposed by operational loads without overstressing the anchorages for the pin, which in this case are the carrier itself at the one end and the end wall of the sleeve at the other, the stresses in these parts being governed by their thicknesses. Hence, it becomes feasible to consider anchorages for both ends of the flexible pin in the form of relatively thin diaphragms offering additional flexibility to the planet pinion support at each end of the central flexible spindle.

It is, therefore, an additional feature to incorporate such added flexibility to each central flexible spindle constituted by each pin 1 by providing a circular recess 9 in the face of the carrier remote from that face from which the pin extends, concentric with the axis of the pin, so as to form a circular diaphragm 10 as just mentioned, the flexure of which relative to the remainder of the carrier 2 will be additive to that of the pin 1 attached thereto. Similarly, a circular diaphragm-like anchorage 11 that can flex relative to the remainder of the sleeve 3 is formed at the end of the pin integral with the sleeve. By selection of the thicknesses of the diaphragms, the overall flexural behaviour of the planet pinion support, and hence the total excusion of the planet pinion under operational loads, can be further controlled.

Alternatively, additional flexibility may be provided at the carrier end of the central flexible pins by affixing them, by means of electron beam welding, to the base of an annular channel formed in the face of the carrier remote from that face from which the pin extends, the pitch circle of this channel coinciding with that of the flexible spindles. The thickness of the base of the channel can be selected to effect control of flexure as in the case of the circular diaphragms.

By relative adjustment of the thickness of the diaphragm 10 at the carrier end, relative to that of the diaphragm 11 at the sleeve end, the flexure that one diaphragm adds to flexure of the pin 1 attached thereto can be selected to be different from that which the other diaphragm adds, whereby still further control can be effected to orientate the planet pinion, in the operational mode, into true parallel alignment with the axes of the sun gear and the annulus gear, should this be necessary.

With flexible planet pinion supports assembled by means of interference fits, it is more difficult to achieve the required grip at the sleeve end of the flexible pin, than at the carrier end, owing to the relative difference in size of these two parts. It is thus necessary, on occasion, to maintain a length of heavy section at the sleeve to achieve the desired grip, the additional mass involved causing a speed penalty in controlling centrifugal forces. The welded attachment of pin to sleeve, by involving less mass at the sleeve end of the pin, permits higher speeds of operation.

I claim:

1. A flexible cantilevered, gear wheel support comprising
   a. a gear wheel support sleeve;
   b. a flexible spindle united at one end to said sleeve by electron beam weld and defining a sleeve zone; and
   c. a carrier having at least one recessed base defining a carrier zone and having united to said base opposite said recess by electron beam weld, the other end of said flexible spindle, whereby the zones of the carrier and the sleeve are of diaphram form so as to be capable of flexing relative to the remainder of the carrier and sleeve, flexure of these zones in use of the support being additive to flexure of the spindle united therewith.

2. A gear wheel support as set forth in claim 1 wherein said carrier zone is formed by the base of a circular recess in the carrier.

3. A gear wheel support as set forth in claim 1 wherein said carrier zone is formed by the base of a channel in the carrier.

* * * * *